United States Patent [19]

Yamada et al.

[11] Patent Number: 4,799,118
[45] Date of Patent: Jan. 17, 1989

[54] THIN FILM MAGNETIC HEAD

[75] Inventors: Masamichi Yamada; Masaaki Kurebayashi; Masakatsu Saito, all of Yokohama; Hitoshi Yanagihara, Kamakura; Katsuo Konishi; Toshio Tsuchiya, both of Yokohama, all of Japan

[73] Assignee: Hitachi, Ltd., Tokyo, Japan

[21] Appl. No.: 918,338

[22] Filed: Oct. 14, 1986

[30] Foreign Application Priority Data

Oct. 14, 1985 [JP] Japan .................. 60-226748
Oct. 31, 1985 [JP] Japan .................. 60-242855

[51] Int. Cl.$^4$ .................. G11B 5/187; G11B 5/31; G11B 5/127
[52] U.S. Cl. .................. 360/125; 360/119; 360/122; 360/126
[58] Field of Search .............. 360/110, 119, 120, 122, 360/125, 126, 127

[56] References Cited

U.S. PATENT DOCUMENTS

| 4,219,855 | 8/1980 | Jones | 360/125 |
| 4,559,572 | 12/1985 | Kumasaka et al. | 360/110 |
| 4,656,547 | 4/1987 | Kumasaka et al. | 360/126 |

FOREIGN PATENT DOCUMENTS

60-175208  9/1985  Japan .................. 360/119

Primary Examiner—John H. Wolff
Assistant Examiner—B. E. Urcia
Attorney, Agent, or Firm—Antonelli, Terry & Wands

[57] ABSTRACT

In a thin film magnetic head consisting of a non-magnetic substrate, and a multilayer structure superposed thereon and including a lower core, a gap material layer, a thin film coil and an upper core, etc., the head sliding surface of the lower core and that of the upper core are so formed that they become wider with increasing distance from the surface of the gap material layer.

12 Claims, 8 Drawing Sheets

THIN FILM MAGNETIC HEAD

BACKGROUND OF THE INVENTION

This invention relates to a thin film magnetic head used in a magnetic recording/reproduction device such as a video tape recorder.

A thin film magnetic head is constructed by superposing a magnetic thin film constituting a lower core, a gap film, a coil film, and a magnetic thin film constituting an upper core one after another on a non-magnetic substrate. These magnetic thin films are so formed that its thickness is generally smaller than 5 μm. In such a magnetic thin film, when it is tried to record/reproduce e.g. video signals on/from a magnetic tape, taking its recording ability into account, it is necessary to set its gap depth so as to be smaller than 3 μm.

However, a thin film magnetic head having such a small gap depth gives rise to a problem that its durability against abrasion is small because of its gap depth which is as small as 3 μm when the magnetic head is intended for the so-called contact operation in which the magnetic head is brought into contact with a recording medium such as in a VTR, etc., although no problem arises when the magnetic head is intended for the so-called floating operation in which a certain space is maintained between the recording medium and the magnetic head such as when a hard disc is used for the recording medium.

Therefore it has been proposed e.g. in U.S. Pat. No. 4,219,855 to construct the magnetic head so that magnetic flux is concentrated towards the gap of the core by forming the thin film magnetic core so as to become wider gradually backward from the position 0 of the gap depth.

However, even in a thin film magnetic head constructed in such a manner, it is not possible to obtain a satisfactory effect to concentrate magnetic flux at the neighborhood of the gap. This is due to the fact that the effect to concentrate magnetic flux stated above is weakened by leakage of magnetic flux between the upper and the lower core at the portion near the position 0 of the gap depth and thus the magnetic flux at the gap, i.e. magnetic flux supplied to the recording medium is reduced. Consequently it is not possible to increase the durability against abrasion by enlarging the size of the gap depth.

SUMMARY OF THE INVENTION

An object of this invention is to provide a thin film magnetic head permitting to resolve the problem of the prior art techniques described above, to concentrate magnetic flux in the neighborhood of the gap with a high efficiency and to obtain recording/reproduction characteristics with a long life and with a high reliability.

In order to achieve this object, this invention is characterized in that the sliding surface of the lower core and that of the upper core, each of which consists of at least one thin film, are so shaped that they are wider with increasing distance from the surface of the gap film so as to obtain the effect to concentrate magnetic flux in the direction of the film thickness of the thin film core in the neighborhood of the gap.

BRIEF DESCRIPTION OF THE DRAWING

FIG. 6b is a cross-sectional view along VIB—VIB in FIG. 6a.

FIGS. 11a to 11j are schemes for explaining the fabrication method of the thin film magnetic head indicated in FIGS. 6a and 6b.

DESCRIPTION OF THE PREFERRED EMBODIMENTS

Hereinbelow some preferred embodiments will be explained, referring to the drawing.

Figure 1A:
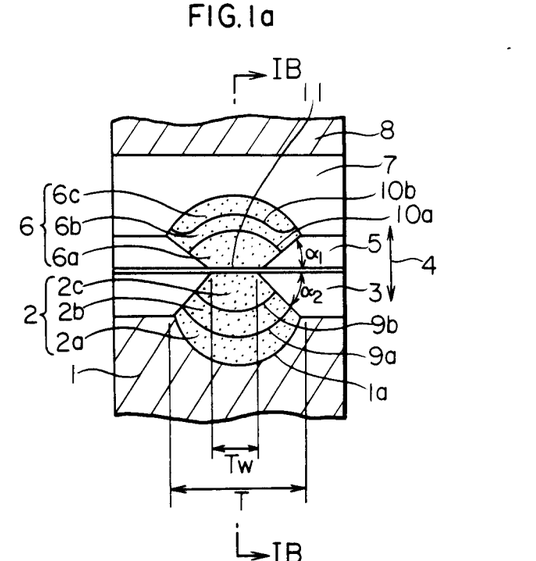
FIGS. 1a, 2, 3 and 4a are front views of the sliding surface of heads showing 1st, 2nd, 3rd and 4th embodiments of the thin film magnetic head according to this invention, respectively.
Figure 1B:
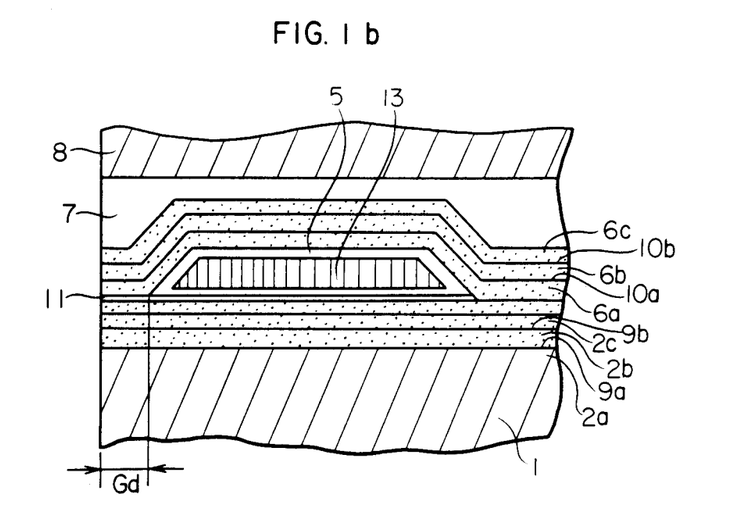
FIGS. 1b and 4b are cross-sectional views along lines IB—IB and IVB—IVB in FIGS. 1a and 4a, respectively.
Figure 1C:
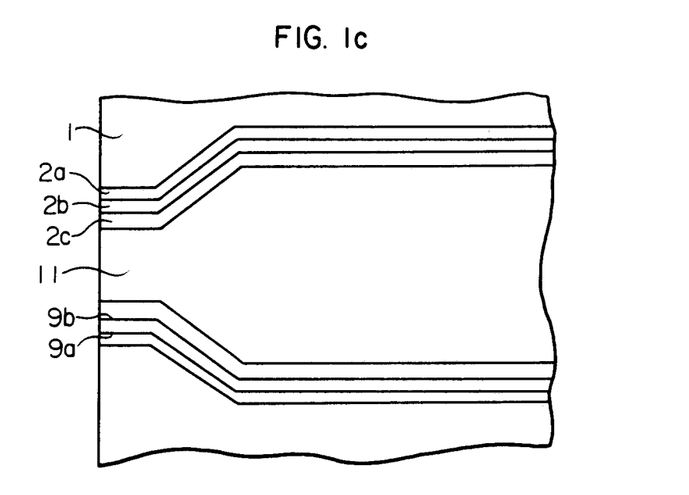
FIG. 1c is a plan view of the lower core of the thin film magnetic head indicated in FIGS. 1a and 1b.

FIG. 1a is a front view of the sliding surface of a thin film magnetic head according to this invention; FIG. 1b is a cross-sectional view along IB—IB in FIG. 1a; and FIG. 1c is a plan view of the lower core thereof. In these figures the reference numeral 1 represents a non-magnetic substrate, in which a groove 1a arc-shaped in cross-section for burying the lower core therein is formed. The non-magnetic substrate 1 is made of e.g. glass, ceramics, non-magnetic ferrite, etc. The reference number 2 indicates the lower core formed in the non-magnetic substrate 1 and a part of the lower core is so shaped that it can be buried in the groove 1a in the non-magnetic substrate 1. The reference numeral 6 denotes the upper core formed so as to be opposed to the lower core 2 through a gap material layer 11 for regulating the gap length. The lower core 2 and the upper core 6 are formed so as to have approximately the same shape. The sliding surface of the lower core 2 and that of the upper core 6 in the neighborhood of the gap (porton before the part where the gap depth is zero), on which recording medium slides, are so formed that their end surfaces are approximately symmetric with respect to the surface of the gap material layer 11 and that they become wider linearly with increasing distance from the surface of the gap material layer 11, forming angles $\alpha_1$ and $\alpha_2$, respectively, as indicated in FIG. 1a. It is possible to concentrate magnetic flux in the direction of the film thickness of the core and to increase the density of the magnetic field near the gap in order to ameliorate its recording ability by forming the sectorial sliding surfaces of the lower and the upper core in the neighborhood of the gap, on which recording medium slides. The effect of the concentration of the magnetic flux in the direction of the film thickness of the core is determined by the ratio of the track width $T_w$ to the maximum core width T of each of the upper and lower cores (the largest width of the groove 1a for burying the lower core therein) indicated in the figure and in the case of azimuth recording as in video tape recorders, in order to prevent crosstalk from the next tracks but one, the width T of the core may be selected to be largest in the following limit;

$T \leq 3T_W$.

In this way, owing to the effect to concentrate magnetic flux in the direction of the film thickness of the core, since the magnetic flux density at the gap portion is increased, if the recording ability is set at the same value as that in the prior art techniques, it is possible to increase the gap depth Gd by a value corresponding to the augmentation in the magnetic flux density and therefore to remove the problem of abrasion in the prior art techniques.

In this case, the cores 2 and 6 are constituted by soft magnetic layers 2a, 2b, 2c and 6a, 6b, 6c made of e.g. sendust, amorphous alloys, etc. The soft magnetic film may be either a multilayer 2a, 2b, 2c as indicated in this embodiment or a single layer. 9a, 9b and 10a, 10b indicate insulator layers disposed between two adjacent layers among 2a, 2b, 2c, 6a, 6b and 6c. The insulator layers 9a, 9b, 10a and 10b are so formed that they are not parallel to the surface of the gap material layer 11 and approximately parallel to or concentric respect to the arc-shaped end surface (precisely in the form of a part of a cylinder) of the lower core 2 or the upper core 6, as illustrated in the figure. The insulator layers 9a, 9b, 10a and 10b are made of e.g. $SiO_2$, $Al_2O_3$, etc.

In this way, by forming the insulator layers 9a, 9b, 10a and 10b so that they are not parallel to the surface of the gap material layer 11 and approximately parallel to or concentric with respect to the arc-shaped end surface (end surface of the film 2a, 6a), it is possible to reduce eddy current loss, when it is used in a high frequency band, and at the same time to decrease the effect that the insulator layers 9a, 9b, 10a and 10b act as false magnetic gaps and produce false signals, so-called contour effect by azimuth loss. The reference numerals 3, 5, 7 show non-magnetic layers, which are so formed that they cover the lower core 2 and the upper core 6. These non-magnetic layers may be made of e.g. $SiO_2$, $Al_2O_3$, etc. 8 is a protection plate formed on the non-magnetic layer 7, which plate 8 reinforces the cores 2 and 6 together with the non-magnetic substrate 1. Owing to this structure the difference in abrasion between the cores 2, 6 and the non-magnetic layers 1, 8 can be kept to be small and thus the life of the cores 2, 6 against abrasion can be elongated.

Figure 2:
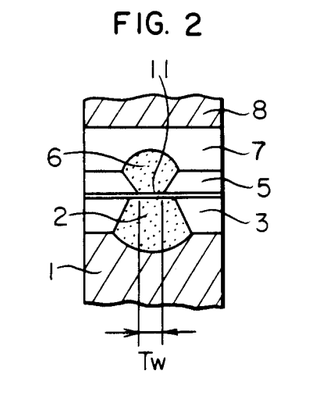
Figure 3:
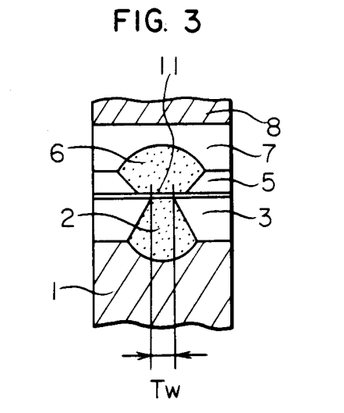

Although the shape and the size of the recording medium sliding surface of the lower core 2 are approximately identical to those of the upper core 6 in the embodiment described above, either one of the upper and the lower core may be smaller than the other and they may be so formed that the track width $T_W$ is defined by the core width of the smaller core at the gap material layer side, as indicated in FIGS. 2 and 3. In this case, an advantage is obtained that the track width can be defined more easily with a high precision.

Figure 4A:
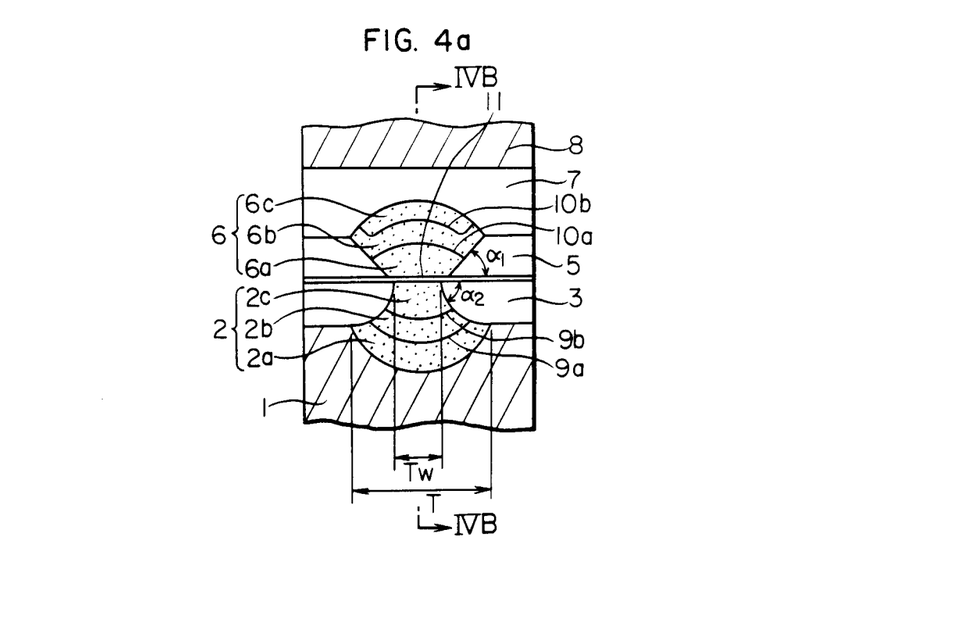
Figure 4B:
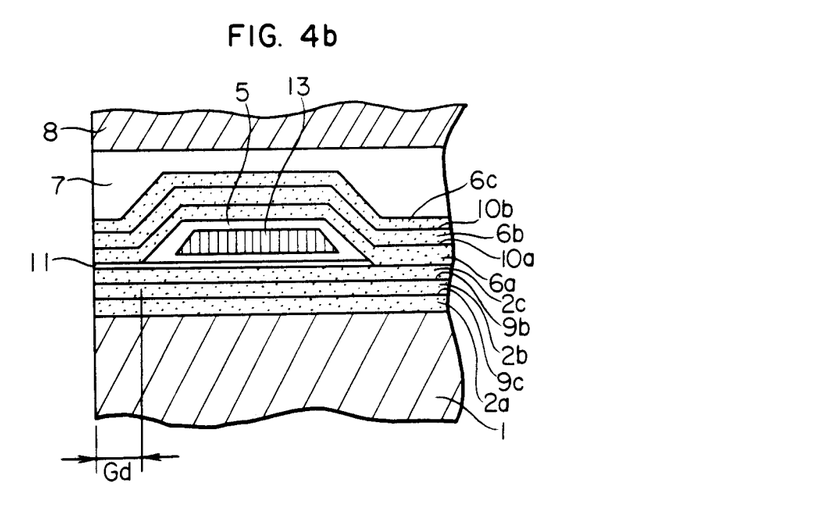

Further, as indicated in FIGS. 4a and 4b, the upper core 6 may be formed in a sector, which becomes linearly gradually wider with increasing distance from the surface of the gap material layer 11 so that each of the two end surfaces forms an angle $\alpha_1$ with the surface of the gap material layer in the same way as in FIG. 1 and the lower core 2 may become downward gradually wider with weakly concavely curved edges, each of which forms an initial angle $\alpha_2$ with the surface of the gap material layer 11.

By forming them in this shape, in particular in the case where the track width $T_w$ is defined by the lower core, an advantage is obtained that the track width can be defined more easily with a high precision and at the same time it is possible to realize the condition to prevent the fringing effect in the direction of the track width between the upper and the lower core;

$\alpha_1 + \alpha_2 \geq 60°$

Figure 6A:
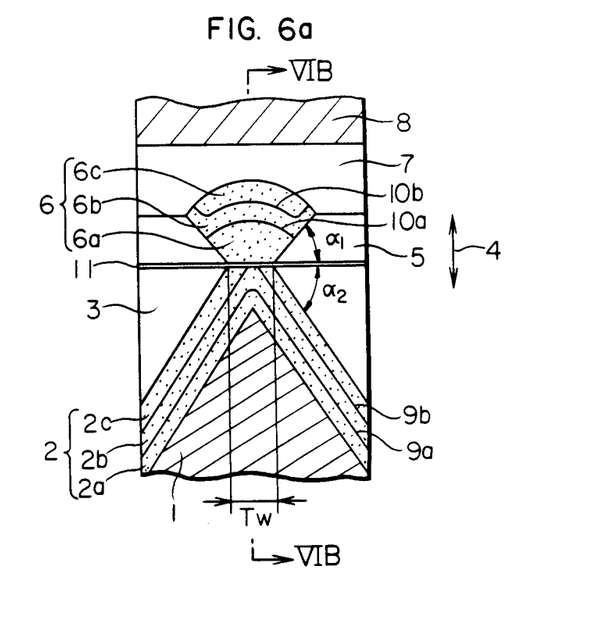
FIG. 6a is a front view of the head sliding surface indicating a 5th embodiment of the thin film magnetic head according to this invention.
Figure 6B:
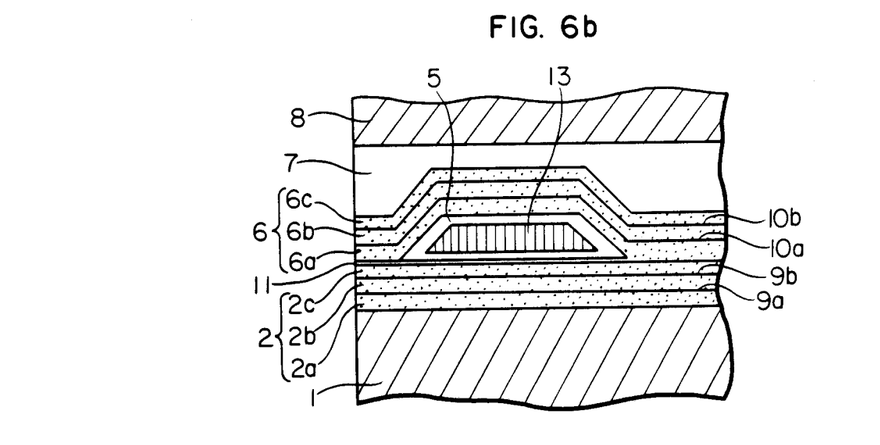

Still further, as indicated in FIGS. 6a and 6b, the upper core may be formed in a sector, which becomes linearly gradually wider with increasing distance from the surface of the gap material layer 11 so that each of the two end surfaces forms an angle $\alpha_1$ with the surface of the gap material layer in the same way as in the embodiment indicated in FIG. 1 in order to have an effect to concentrate magnetic flux in the direction of the film thickness and the lower core 2 may be constructed in a V shape so that magnetic flux is concentrated from both the side walls of protrusions of the non-magnetic substrate 1. In this way it is possible to strengthen the gap magnetic field at the gap portion in order to increase its recording ability and further to lengthen remarkably the life of the head against abrasion, because the gap depth can be great.

Further, by forming the lower core 2 and the upper core 6 in a multilayer structure, insulator layers 9a, 9b in a V shape, and insulator layers 10a, 10b in an arc shape (in the shape of a part of a cylinder) parallel to the upper surface of the upper core 6, it is possible to reduce eddy current loss in the case where it is used in a high frequency band and at the same time to decrease the effect that the insulator layers 9a, 9b, 10a and 10b act as false magnetic gaps and produce false signals, so-called contour effect, by azimuth loss.

Further, it is possible to reduce unbalanced abrasion between the cores and the non-magnetic substrate and to lengthen the life against abrasion, because the cores 2, 6 made of a material worn away relatively easily are reinforced by non-magnetic layers 1, 8 in the direction of the movement of the recording medium.

Figure 7:
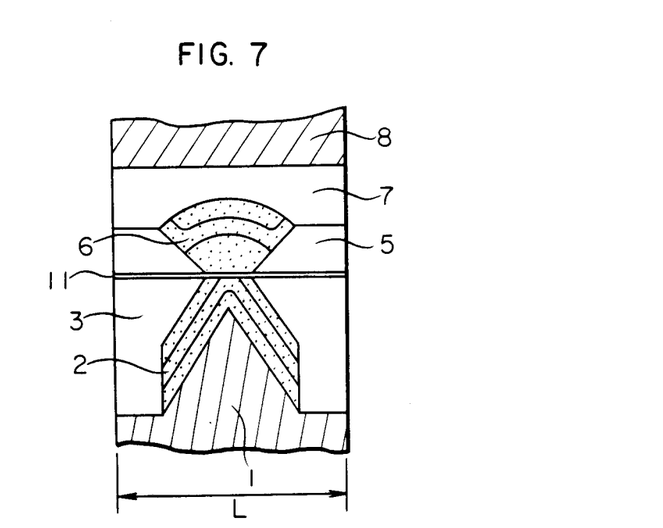
FIGS. 7, 8, 9 and 10 are front views of the sliding surface of heads showing 6th, 7th, 8th and 9th embodiments of the thin film magnetic head according to this invention.

Further, as an application of the embodiment described above, the lower core 2 may be so formed that its core width is smaller than the total width L of the head sliding surface, as indicated in FIG. 7.

Figure 8:
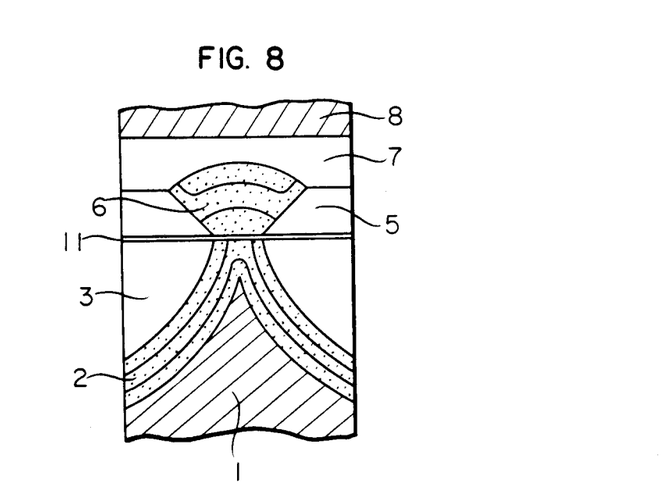

Still further the lower core 2 may be formed on a non-magnetic substrate 1 having a protrusion with both the side surfaces, which are convex downward, as indicated in FIG. 8.

Figure 9:
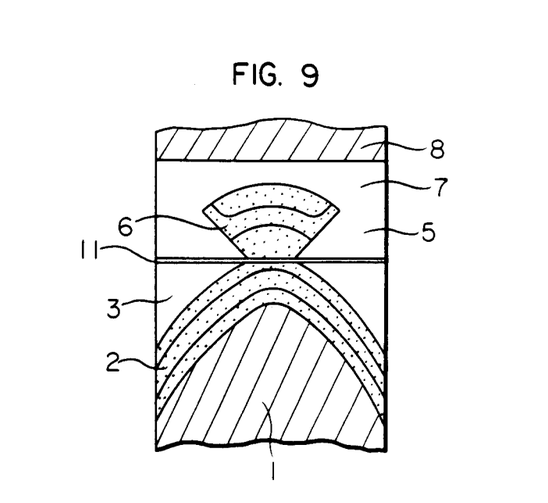

Still further the lower core 2 may be formed on a non-magnetic substrate 1 having a protrusion with both the side surfaces, which are convex upward, as indicated in FIG. 9.

Figure 10:
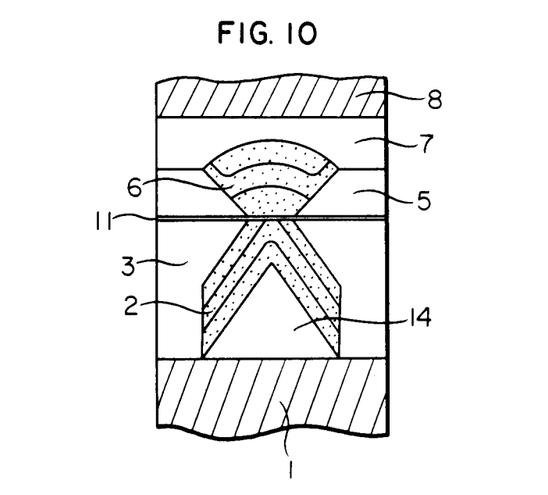

Still further the lower core 2 may be formed on a non-magnetic protrusion 14, which is disposed on a non-magnetic substrate 1, as indicated in FIG. 10.

FIGS. 5a to 5j are schemes for explaining the fabrication method of the thin film magnetic head indicated in FIGS. 4a and 4b, which consists of the steps illustrated in these schemes.

Hereinbelow the fabrication method of the thin film magnetic head indicated in FIGS. 4a and 4b will be explained.

Figure 5A:
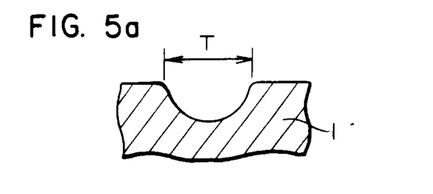
FIGS. 5a to 5j are schemes for explaining the fabrication method of the thin film magnetic head indicated in FIGS. 4a and 4b.
Figure 5B:
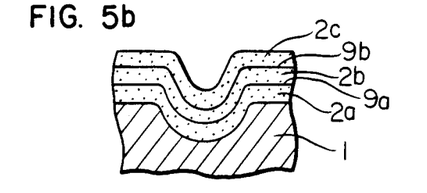
Figure 5C:
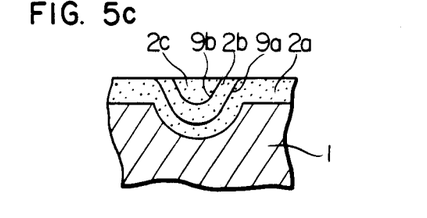
Figure 5D:
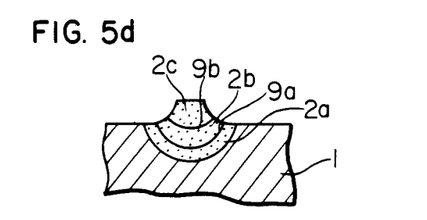
Figure 5E:
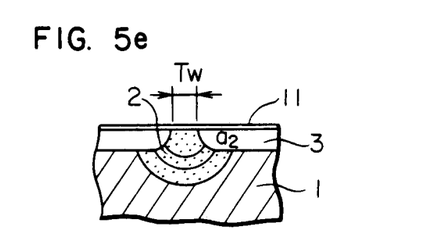
Figure 5F:
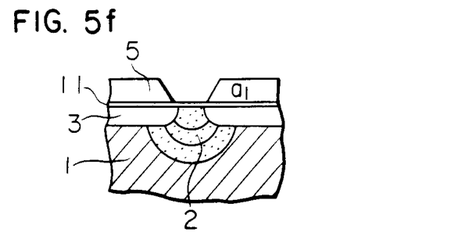

At first, in FIG. 5a, a groove having a width T is formed on a non-magnetic substrate 1 made of e.g. glass, ceramics, non-magnetic ferrite, etc. by mechanical working, etching, etc. When the track width $T_W$ is 20

μm, this width T is about 55 μm ($\leq 3T_W$) and the depth of the groove is 20 μm. Then, in FIG. 5b, soft magnetic layers 2a, 2b, 2c made of sendust, amorphous alloy, etc. and insulator layers made of $SiO_2$, $Al_2O_3$, etc. are superposed alternately one after another. The sum of the film thicknesses is about 30 μm. Although the number of layers is 3 in this embodiment, the number may vary, depending on the used frequency band. In FIG. 5c, the soft magnetic layers 2a, 2b, 2c are made flat by lapping, etc. Further, in FIG. 5d, the soft magnetic layers are etched by ion-milling, etc. while masking the surface defining the track width. In FIG. 5e, a non-magnetic layer 3 made of $SiO_2$, $Al_2O_3$, forsterite, etc. is formed and made flat by lapping, etc. After that, a gap material layer 11 for defining the gap length is deposited thereon in a predetermined thickness. Then, although it is not indicated here, a thin film coil 13 and a non-magnetic and insulating layer 5 are formed, as indicated in FIG. 4b and the non-magnetic and insulating layer 5 is taper-etched, as indicated in FIG. 5f, so that its end surfaces at the gap portion form a taper angle $\alpha_1$. Since, if the taper angle $\alpha_1$ is too large, film characteristics of the upper core 6a disposed thereon deteriorate, the taper angle $\alpha_1$ should satisfy the following conditions;

$$\alpha_1 < \alpha_2 \text{ and } \alpha_1 + \alpha_2 \geq 60°.$$

Figure 5G:
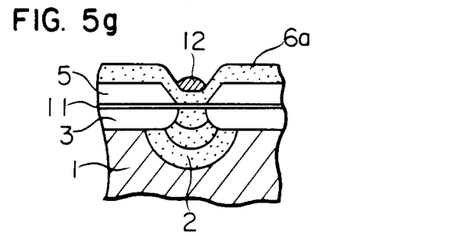
Figure 5H:
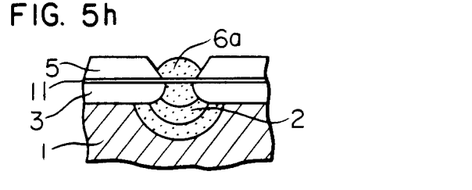
Figure 5I:
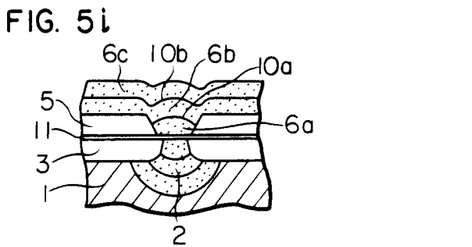
Figure 5J:
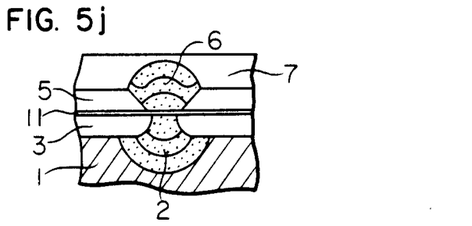

In FIG. 5g, a mask 12 is patterned approximately into a part of a cylinder, after having formed a layer 6a of the upper core. This cylindrical form of the mask 12 is transferred to the upper surface of the layer 6a by ion-milling, etc. In FIG. 5i, insulator layers 10a, 10b and layers 6b, 6c of the upper core are superposed alternately one after another. In FIG. 5j, the excessive portion of the upper core 6b, 6c over the flat portion of the insulating layer 5 is removed by etching and further a protection film 7 is formed, whose upper surface is made flat. Finally, by sticking a protection plate 8 thereto, the thin film magnetic head according to this invention indicated in FIGS. 4a and 4b can be obtained.

The thin film magnetic heads indicated in FIGS. 1a to 3 can be fabricated also by methods approximately identical to that described above.

FIGS. 11a to 11i are schemes for explaining the fabrication method of the thin film magnetic head indicated in FIGS. 6a and 6b. This fabrication method consists of the steps indicated in FIGS. 11a to 11i.

Figure 11A:
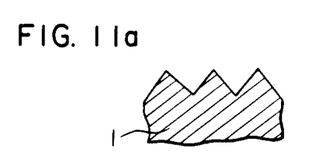

At first, in FIG. 11a, approximately V-shaped protrusions are formed on a non-magnetic substrate 1 made of e.g. glass, ceramics, non-magnetic ferrite, etc. by mechanical working, etching, etc. Although the two side surfaces of these protrusions are plane, these two side surfaces may be convex upward or downward, as indicated in FIG. 8 or 9. Further, the protrusion may be formed by a non-magnetic body separated from the non-magnetic substrate 1, as indicated in FIG. 12.

Figure 11B:
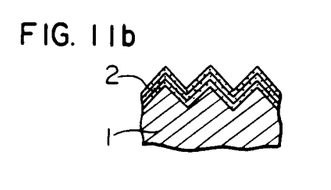
Figure 11C:
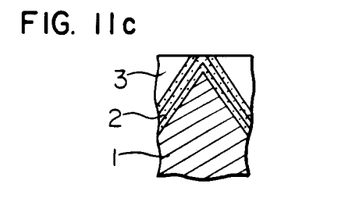
Figure 11D:
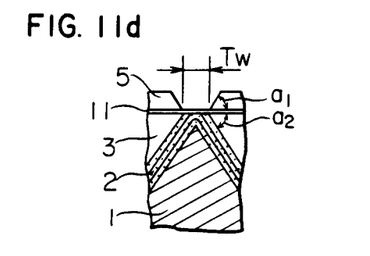
Figure 11E:
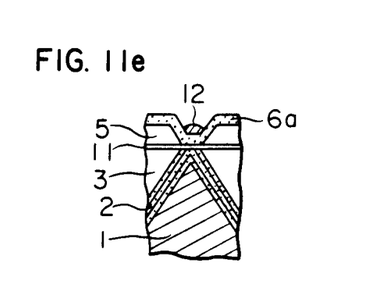

Next, in FIG. 11b, soft magnetic layers made of sendust, amorphous alloy, etc., which are to form the lower core, are superposed together with insulator layers made of $SiO_2$, $Al_2O_3$, etc. alternately one after another. The sum of the film thickness is about 30 μm. Although the number of layers is 3 in this embodiment, the number may vary, depending on the used frequency band. In FIG. 5c, after having formed a non-magnetic thin film thereon or filled recesses between adjacent protrusions with molten low melting point glass, etc., it is made flat together with the soft magnetic layers by lapping, etc. At this time the lapping amount is so regulated that the exposed core width is approximately equal to the track width. In FIG. 11d, a gap material layer 11 for defining the gap length is deposited thereon. Then, a thin film coil 13 and a non-magnetic and insulating layer 5 are formed, as indicated in FIG. 6b, although the former is omitted in the figure, and as indicated in FIG. 11d, the non-magnetic and insulating layer 5 is taper-etched so that its end surfaces at the gap portion form a taper angle $\alpha_1$. Since, if the taper angle $\alpha_1$ is too large, film characteristics of the upper core 6a disposed thereon deteriorate, the taper angles $\alpha_1$ and $\alpha_2$ ($\alpha_2$ is the taper angle formed by the end surfaces of the lower core and the surface of the gap material layer 11) are so selected that they satisfy the following conditions;

$$\alpha_1 < \alpha_2 \text{ and } \alpha_1 + \alpha_2 \geq 60°.$$

Figure 11F:
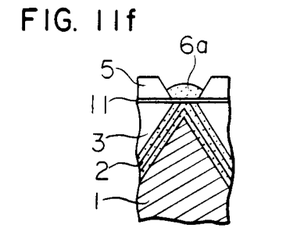
Figure 11G:
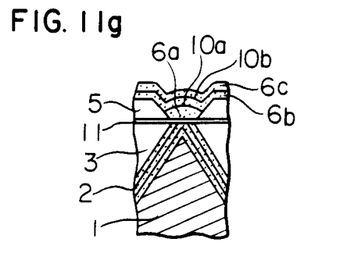
Figure 11H:
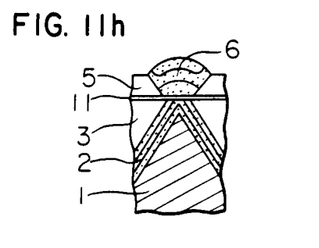
Figure 11I:
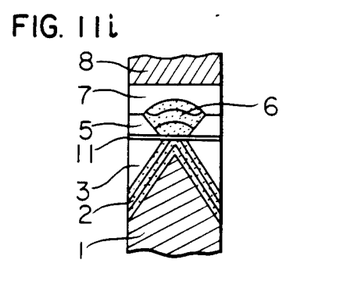

In FIG. 5e, a mask 12 is patterned approximately into a part of a cylinder, after having formed a layer 6a of the upper core. In FIG. 11f, this cylindrical form of the mask 12 is transferred to the upper surface of the layer 6a by ion-milling, etc. In FIG. 11g, insulator layers 10a, 10b and layers 6b, 6c of the upper core are superposed alternately one after another. In FIG. 11h, the excessive portion of the upper core 6b, 6c over the flat portion of the non-magnetic and insulating layer 5 is removed by etching. In FIG. 11i, a protection film 7 is formed, whose upper surface is made flat. Further, aftrer sticking a protection plate 8 thereto, the head sliding surface is formed by mechanical working, etc. In this way, the thin film magnetic head according to this invention indicated in FIGS. 6a and 6b. The thin film magnetic heads indicated in FIGS. 7 to 10 can be fabricated also by methods approximately identical to that described above.

We claim:

1. A thin film magnetic head comprising a non-magnetic substrate, a first core member formed on said non-magnetic substrate, a gap material layer formed on said first core member, and a second core member formed on said gap material layer, said first and second core members constituting a magnetic path for magnetic flux with which information is read/written on a magnetic recording medium, said first core member, said gap material layer and said second core member having first ends constituting a recording medium engaging end of said magnetic head, a surface of each of said first and second core members which faces said gap material layer to define a gap of said magnetic head having a width, as measured on a first plane containing a surface of said recording medium engaging end of said magnetic head in a direction parallel to said gap material layer, which is smaller than a width of a surface of each of said first and second core members as measured on a second plane parallel with and spaced from said first plane in a direction parallel with said gap material layer, a width of said first and second core members, as measured on said first plane in a direction parallel to said gap material layer, increasing in a direction perpendicular to and farther away from said gap material layer, and a surface of each of said first and second core members opposite to said gap material facing surface of each of said first and second core members, at least on said first plane containing the surface of said recording medium engaging end of said magnetic head, being not parallel with said gap material layer.

2. A thin film magnetic head according to claim 1, wherein each of said first and second core members has a sector shape at said recording medium engaging end of said magnetic head.

3. A thin film magnetic head according to claim 2, wherein a maximum width T of each of said first and second core members as measured on said first plane in a direction parallel with said gap material layer has a relationship with respect to a track width Tw defined by said gap such that $T \leq 3Tw$.

4. A thin film magnetic head according to claim 1, wherein said first core member has a substantially V-shape and said second core member has a sector shape at said recording medium engaging end of said magnetic head.

5. A thin film magnetic head according to claim 4, wherein a maximum width T of each of said first and second core members as measured on said first plane in a direction parallel with said gap material layer has a relationship with respect to a track width Tw defined by said gap such that $T \leq 3Tw$.

6. A thin film magnetic head according to claim 1, wherein each of said first and second core members has a multilayer structure with magnetic layers and insulating layers alternately disposed one upon another and each of said insulating layers between two adjacent magnetic layers is, at least at said recording medium engaging end of said magnetic head, not parallel with said gap material layer.

7. A thin film magnetic head according to claim 1, wherein an angle $\alpha_1$ formed between a side surface of said second core member and said gap material layer and an angle $\alpha_2$ formed between a side surface of said first core member and said gap material layer are such that $\alpha_1 < \alpha_2$, and $\alpha_1 + \alpha_2 \geq 60$ degrees, said angles $\alpha_1$ and $\alpha_2$ being measured in the vicinity of said gap.

8. A thin film magnetic head according to claim 1, wherein a surface of said first core member as measured on said first plane containing the surface of said recording medium engaging end of said magnetic head is different in size from a surface of said second core member as measured on said first plane.

9. A thin film magnetic head comprising a non-magnetic substrate, a gap material layer formed on said first core member, a second core member formed on said gap material layer, and a coil member formed between said gap material layer and said second core member, said first and second core members constituting a magnetic path for magnetic flux with which information is read/written on a magnetic recording medium, said first core member, said gap material layer and said second core member having first ends constituting a recording medium engaging end of said magnetic head, said first core member having substantially a V-shape with a width of said first core member, as measured on a first plane containing a surface of said recording medium engaging end of said magnetic head in a direction parallel to said gap material layer, increasing in a direction perpendicular to and farther away from said gap material layer, and said second core member having a sector shape with a width of said second core member, as measured on said first plane in a direction parallel to said gap material layer, increasing in a direction perpendicular to and farther away from said gap material layer.

10. A thin film magnetic head according to claim 9, wherein each of said first and second core members has a multilayer structure with magnetic layers and insulating layers alternately disposed one upon another and each of said insulating layers between two adjacent magnetic layers is, at least at said recording medium engaging end of said magnetic head, not parallel with said gap material layer.

11. A thin film magnetic head according to claim 9, wherein an angle $\alpha_1$ formed between a side surface of said second core member and said gap material layer and an angle $\alpha_2$ formed between a side surface of said first core member and said gap material layer are such that $\alpha_1 < \alpha_2$, and $\alpha_1 + \alpha_2 > 60$ degrees, said angles $\alpha_1$ and $\alpha_2$ being measured in the vicinity of said gap.

12. A thin film magnetic head according to claim 9, wherein a surface of said first core member as measured on said first plane containing the surface of said recording medium engaging end of said magnetic head is different in size from a surface of said second core member as measured on said first plane.

* * * * *